United States Patent
Stewart et al.

[19]

[11] Patent Number: 5,934,851

[45] Date of Patent: Aug. 10, 1999

[54] STAKED FASTENER HAVING WRENCHABLE FLATS

[75] Inventors: Robert E. Stewart, Farmington Hills; Carl Lewis, Sterling Heights, both of Mich.

[73] Assignee: MSD Stamping, Inc., Livonia, Mich.

[21] Appl. No.: 09/107,629

[22] Filed: Jun. 30, 1998

Related U.S. Application Data

[60] Provisional application No. 60/052,771, Jul. 2, 1997.

[51] Int. Cl.⁶ .............................. F16B 37/04; F16B 39/28
[52] U.S. Cl. ............................ 411/183; 411/113; 411/174
[58] Field of Search .................................... 411/107, 174, 411/175, 176, 183, 113, 432, 533

[56] References Cited

U.S. PATENT DOCUMENTS

| | | |
|---|---|---|
| 2,236,180 | 3/1941 | Kost ..................................... 411/176 X |
| 2,784,930 | 3/1957 | Wernecke ............................. 411/176 X |
| 3,496,980 | 2/1970 | Steward et al. . |
| 4,114,670 | 9/1978 | Akashi et al. ........................... 411/176 |
| 5,445,483 | 8/1995 | Fultz ................................... 411/183 X |

*Primary Examiner*—Neill Wilson
*Attorney, Agent, or Firm*—Howard & Howard

[57] ABSTRACT

A fastener assembly having improved push-out resistance and bearing engagement characteristics while maintaining serviceability by having stakes located in the sidewall flats. The fastener is mounted in the opening of a retainer and a stake is located in the sidewall. The stake extends from the sidewall and engages the retainer face without disturbing the fastener edge, such that the retainer is retained to the fastener flange by sandwiching retainer between the stake and the flange.

8 Claims, 3 Drawing Sheets

STAKED FASTENER HAVING WRENCHABLE FLATS

This application claims a priority to a provisional application filed on Jul. 2, 1997, application no. 60/052,771.

BACKGROUND OF THE INVENTION

The present invention generally relates to a fastener assembly, and more particularly to a fastener having stakes located in the sidewall flats to maintain serviceability.

Fastener assemblies provide manufacturing advantages unavailable to the individual combination of a nut and a bolt. It is known to mount a commonly available hexagonal fastener having a circular flange at one end into a sheet metal retainer to form such a fastener assembly. U.S. Pat. No. 3,496,980 discloses such a fastener assembly. The polygonal fasteners include a flange allowing the retainer assemblies to be staked in place by scraping material from the points of the fastener thereby attaching the fastener to the retainer. This worked well enough for the purpose of attachment, but destroyed the edges of the hex fastener. Thus, the destruction of the edges rendering the fastener assembly unserviceable as a standard wrench or socket uses the fastener edges to grasp onto the fastener for removal.

SUMMARY OF THE INVENTION

The present invention overcomes the above problem by providing a fastener assembly which includes a fastener having a stake located in the fastener sidewall. The sidewall defines an edge, and a flange extends from the sidewall. The fastener is mounted in the opening of a retainer and the stake extends from the sidewall to engage the retainer face without disturbing the fastener edge. The retainer is thereby retained to the fastener by the interaction of the stake and the flange.

The present invention further discloses a staking die that is designed to clear the edges of the retainer, while providing sufficient contact with the fastener sidewall to generate a stake sufficient to hold the retainer on the fastener. To generate effective stakes the projections have to remain stationary during the staking process while leaving enough sidewall for the effective application of torque. Preferably, the fastener is rotationally aligned to leave over fifty percent (50%) of the material which forms the fastener edges.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1A:
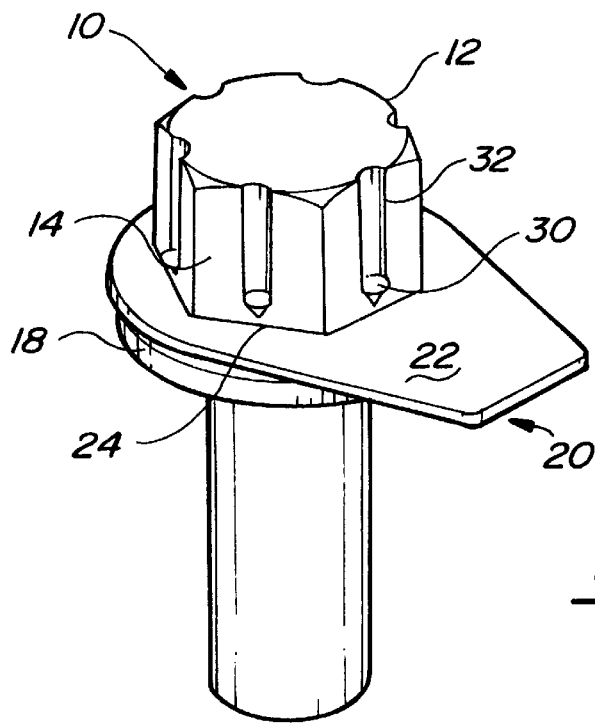
FIGS. 1A and 1B are a general perspective views of the male and female fastener assembly of the present invention.
Figure 1B:
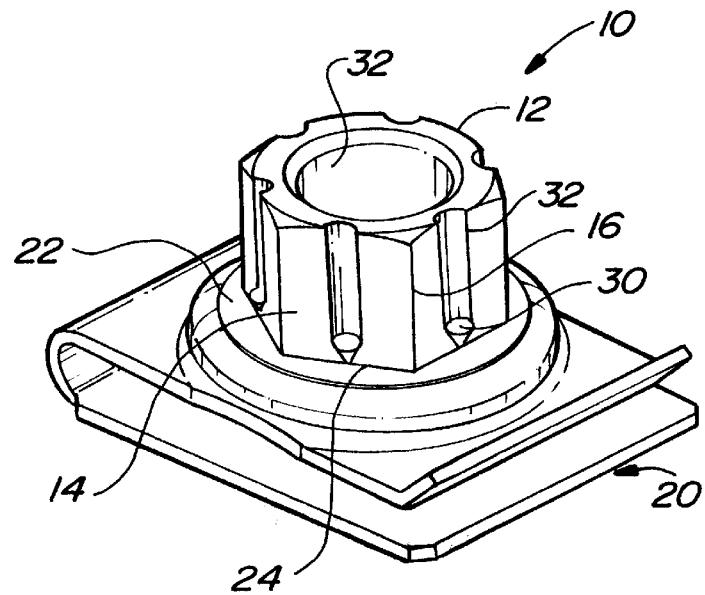

A fastener assembly 10 of the present invention is generally shown in FIGS. 1A and 1B. The fastener assembly 10 includes a fastener 12 having sidewalls 14 defining edges 16, and a flange 18 extending from the sidewalls 14. The fastener 12 is mounted in the opening 24 of a retainer 20 and a stake 30 is located in the sidewall 14. The stake 30 extends from the sidewall 14 and engages the retainer face 22 without disturbing the fastener edge 16, such that the retainer 20 is retained to the fastener 12 by the interaction of the stake 30 and the flange 18.

Figure 2A:
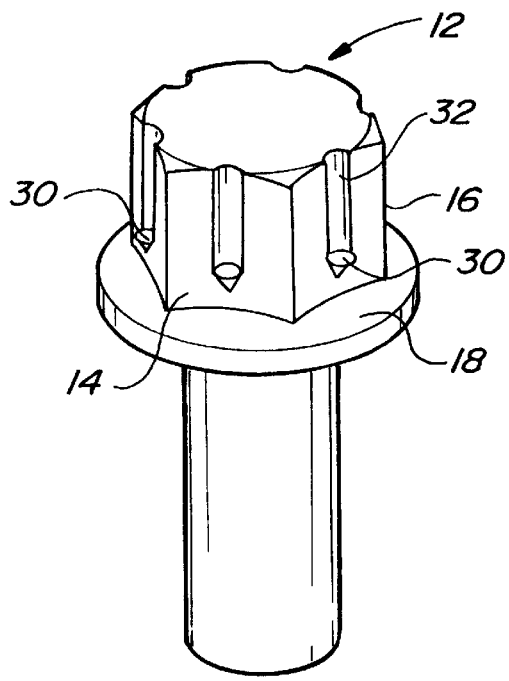
FIGS. 2A and 2B are a general perspective views of a male and a female fastener.
Figure 2B:
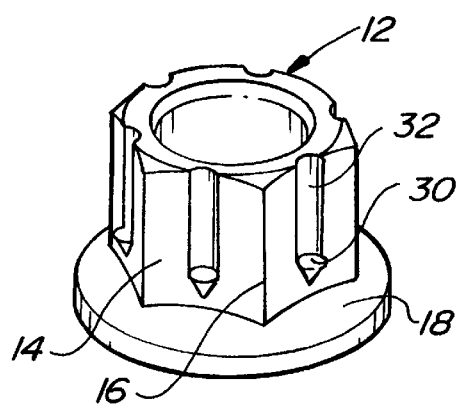

FIGS. 2A and 2B illustrate that the fastener 12 is of a polygonal shape and is preferably of standard hexagonal dimensions to provide for the receipt of a standard torquing tool such as the socket of a racket and socket. Further, the diameter of flange 18 is preferably larger than the distance across the opposed edges 16 of the fastener 12 such that the flange 18 projects radially outward from the fastener 12 and is more prominent along the sidewalls 14.

Figure 3A:
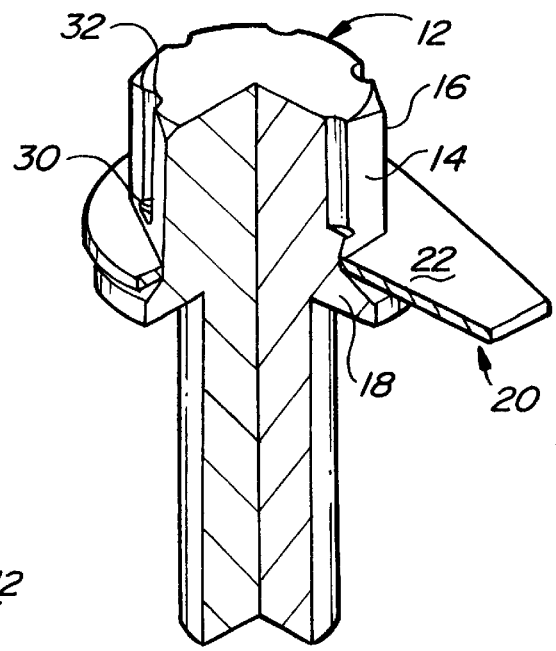
FIGS. 3A and 3B are sectional views of the male and female fastener assembly of FIGS. 1A and 1B.
Figure 3B:
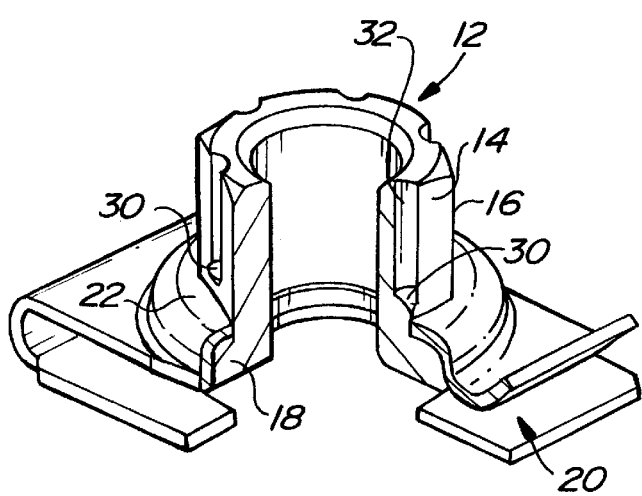

As illustrated in FIGS. 3A and 3B, the retainer 20 is preferably formed from a strip of sheet metal, and includes an opening 24 to accommodate the insertion of a fastener 12. The retainer 20 may be further formed to have the general shape of a "C" clip (FIG. 1) or other described shapes. Additionally, an emboss can be incorporated into the retainer 20 such that the flange 18 of the fastener 12 is concealed by the retainer 20 or os flush with the surface engaging the member to which the assembly 10 is attached. Preferably, a hexagonal opening 24 is provided to allow the passage of a similarly shaped hexagonal fastener 12. The opening 24 is is dimensionally smaller across the edges than the diameter of the flange 18, to thereby prevent the passage of the flange 18 through the retainer 20.

Figure 4:
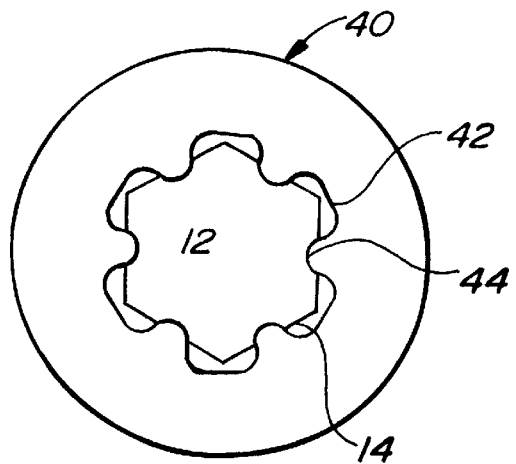
FIG. 4 is a top silhouette view of the staking button, fastener and retainer as they appear during staking operation.

FIG. 4 illustrates the novel staking die 40 of the present invention in an ideal position for staking. The staking die 40 clears the points of the hexagonal fastener 12 while making sufficient contact with the sidewalls 14 to generate adequate stakes 30 (FIG. 1) to hold the retainer 20 to the fastener 12. Staking is accomplished by the opening 42 in the staking die 40. The edges 16 are avoided by having sufficient relief cut into the die 40 to avoid contact with the fastener edges 16. To generate effective stakes 30 the projections 44 have to remain stationary during the staking process and be of sufficient size to generate adequate stakes 30 while leaving enough sidewall 14 for effective torque application. Applicants have found that the fastener 12 need only be aligned rotationally well enough to leave fifty percent (50%) of the material which makes up the edges 16 of the fastener 12.

Figure 5:
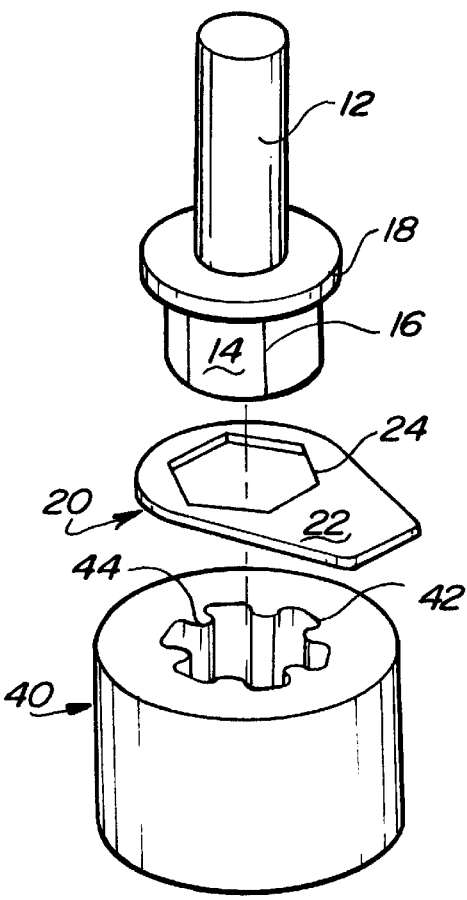
FIG. 5 an exploded isometric view of a fastener, retainer, and staking button, just prior to assembly.
Figure 6:
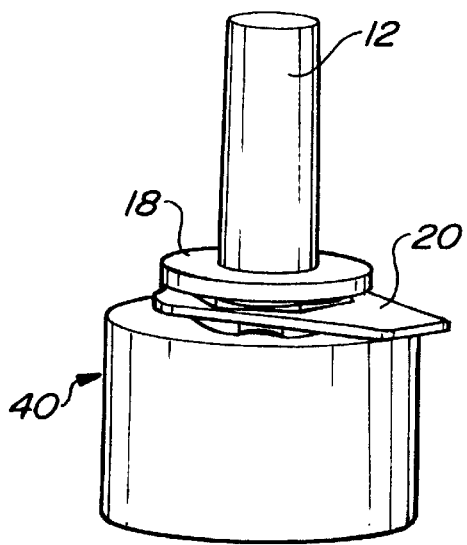
FIG. 6, is an overall perspective view of a staking button positioned on the fastener assembly of the present invention.
Figure 7:
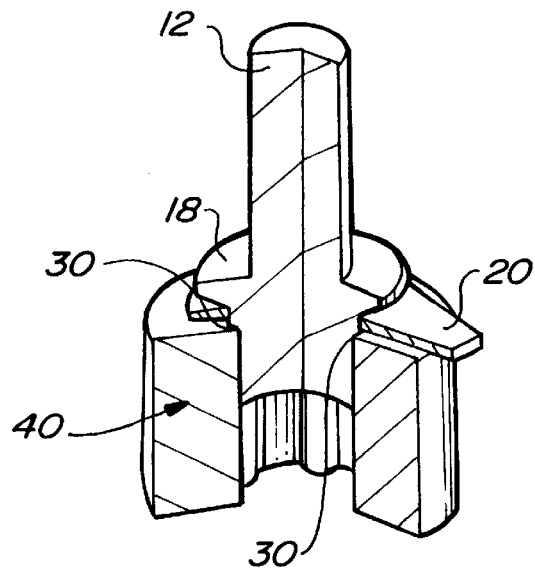
FIG. 7 is a sectional view of a staking button positioned on the fastener assembly FIG. 6.

After the retainer 20 is sufficiently formed as to allow the insertion of the fastener 12 i.e., to at least have the opening 24, the fastener 12 may be installed as shown by FIGS. 5, 6, and 7. The fastener 12 is inserted through the opening 24 of the retainer 20 and is held in place while the staking die 30 is forced onto the fastener 12. The staking die 40 is forced towards the retainer 20 and the staking surface 44 generates material voids 32 and stakes 30 sufficient enough to hold the retainer 20 to the fastener 12 by sandwiching the retainer 20 between the stakes 30 and flange 18.

After the fastener assembly 10 is secured to the retainer 20 the staking die 40 is removed and any further forming can be performed on the retainer 20 to provide the final configuration of the fastener assembly 10. For example, such forming could be accompanied by a progressive die. In the preferred embodiment, the staking die 40 is mounted in a press and the fastener 12 is received within a base or press plates to allow formation of the stakes 30 and sandwiching of the retainer 20 between the stakes 30 and flange 18.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A fastener assembly comprising:

a fastener having at least one sidewall and at least one edge, and a flange extending from said sidewall, said flange extending circumferentially around said fastener;

a retainer having a main body and an opening in said main body, said fastener mounted within said opening, said main body having first and second surfaces;

a stake located in said sidewall, said stake extending from said sidewall into engagement with said first surface of said first surface of said retainer without disturbing said edge;

said retainer is retained to said fastener by sandwiching said retainer between said stake and said flange.

2. The fastener assembly of claim 1, wherein said fastener has a plurality of sidewalls, each of said sidewalls having a stake.

3. The fastener assembly of claim 1, wherein said fastener has a plurality of polygonal oriented sidewalls.

4. The fastener assembly of claim 1, wherein said opening has a mating orientation such that said fastener generally mates with said opening.

5. A method of retaining a fastener in a retainer, said method comprising the steps of:

(a) inserting a fastener having a plurality of edges defined by ajoining sidewalls and a flange extending radially from said fastener, said flange extending circumferentially around said fastener through an opening of a retainer, such that said retainer is adjacent to said flange; and (b) deforming a portion of at least one of said sidewalls without disturbing said edges to affix said retainer between said deformed portion of said fastener and said flange.

6. A method as recited in claim 5, wherein step (a) further comprises press fitting said fastener into said opening.

7. A method as recited in claim 5, wherein step (b) is accomplished by staking.

8. A method as recited in claim 5, wherein step (b) further comprises staking each of said sidewalls.

* * * * *